(12) United States Patent
Wojdacki, Jr.

(10) Patent No.: US 9,774,768 B1
(45) Date of Patent: Sep. 26, 2017

(54) WIPEABLE CAMERA SYSTEM AND DEVICE

(71) Applicant: GM GLOBAL TECHNOLOGY OPERATIONS LLC, Detroit, MI (US)

(72) Inventor: Raymond L. Wojdacki, Jr., Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/168,909

(22) Filed: May 31, 2016

(51) Int. Cl.
*H04N 5/225* (2006.01)
*B60R 11/04* (2006.01)

(52) U.S. Cl.
CPC ........... *H04N 5/2252* (2013.01); *B60R 11/04* (2013.01)

(58) Field of Classification Search
CPC .................................................. H04N 5/2252
See application file for complete search history.

(56) References Cited

U.S. PATENT DOCUMENTS

| 8,234,740 B2 * | 8/2012 | Kereth | ...................... B08B 1/00 15/320 |
| 2012/0000024 A1 * | 1/2012 | Layton | ................... G03B 11/00 15/97.1 |

FOREIGN PATENT DOCUMENTS

| JP | 56169475 A | * 12/1981 | ........... H04N 5/2251 |
| JP | 08190143 A | * 7/1996 | |

\* cited by examiner

*Primary Examiner* — Gary C Vieaux
(74) *Attorney, Agent, or Firm* — Quinn IP Law

(57) ABSTRACT

A camera system includes a camera having a lens, and a wiper assembly attached to the camera and configured for removing a contaminant from the system. The assembly includes a housing including a frame having a back panel that defines a first viewport covering the lens; a shield; and a disc. The shield defines a second viewport spaced apart from the first and is attached to the frame to define a wash chamber between the shield and the frame. The disc is formed from a transparent material and is disposed between the shield and the housing within the chamber so as to cover the lens at the first viewport. The disc is rotatable within the chamber between a first position in which the contaminant is disposed on and partially obscures the disc, and a second position in which the contaminant is not disposed on the disc at the second viewport.

18 Claims, 2 Drawing Sheets

WIPEABLE CAMERA SYSTEM AND DEVICE

TECHNICAL FIELD

The disclosure relates to a camera system.

BACKGROUND

A device may include a camera system that is configured to monitor conditions exterior to the device. For example, camera systems such as security camera systems and vehicle camera systems may monitor a position of objects, may detect motion near the camera system, and/or may monitor road surface conditions. Since many devices operate in wet and/or dirty environments, such camera systems are often exposed to moisture, debris, and/or surface contaminants that may diminish a quality of an image produced by the camera system.

SUMMARY

A camera system includes a camera having a lens, and a wiper assembly attached to the camera and configured for removing a contaminant from the camera system. The wiper assembly includes a housing, a shield, and a disc. The housing includes a circular frame having a back panel that defines a first viewport, wherein the first viewport covers the lens. The shield defines a second viewport spaced apart from the first viewport and is attached to the circular frame to define a wash chamber between the shield and the circular frame. The disc is formed from a transparent material and is disposed between the shield and the housing within the wash chamber such that the disc covers the lens at the first viewport. The disc is rotatable within the wash chamber between a first position in which the contaminant is disposed on and at least partially obscures the disc at the second viewport, and a second position in which the contaminant is not disposed on the disc at the second viewport.

In one embodiment, the disc has a central portion and an edge, and includes a plurality of teeth extending from the central portion along the edge. The wiper assembly also includes a fluid disposable in contact with the disc. The circular frame further includes a circular wall abutting the back panel and defining an inlet port configured for injecting the fluid against the plurality of teeth such that the disc rotates from the first position to the second position, and an outlet port configured for removing the fluid and the contaminant from the wash chamber when the disc is disposed in the second position. The wiper assembly also includes a pump configured for delivering the fluid to the inlet port.

A device includes a body defining a cavity and the camera system attached to the body within the cavity.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
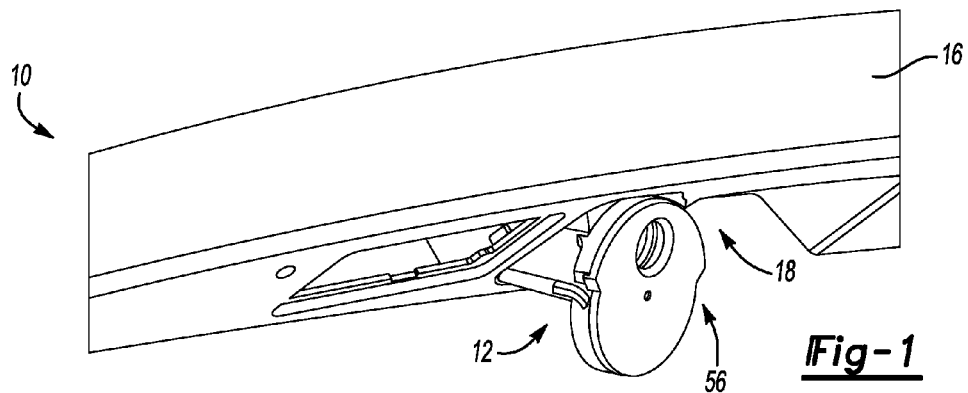
FIG. 1 is a schematic illustration of a perspective view of a device including a camera system.

Referring to the Figures, wherein like reference numerals refer to like elements, a device 10 including a camera system 12 is shown generally in FIG. 1. The camera system 12 may be useful for non-automotive applications such as remote monitoring applications and security applications for industrial devices or aircraft. Alternatively, the camera system 12 may be useful for vehicles, such as automotive vehicles, that require a camera 14 (FIG. 2) that is operable in harsh environmental conditions, e.g., a rear-view vehicle camera. For example, the camera system 12 may be useful in dusty, dirty, icy, salty, and/or wet operating environments.

The camera system 12 may be situated at any position on the device 10 and may be arranged to provide monitoring of, for example, motion, weather conditions, a relative position of an object with respect to the device 10, road surface conditions, traffic conditions, and/or a presence of an object external or adjacent to the device 10. Therefore, the camera system 12 may be a component of a security system, a monitoring system, a wireless communications system, an autonomous driving system, an automotive lane departure alert system, and/or an object detection system for the device 10. In one non-limiting example, the device 10 may be a vehicle, and the camera system 12 may be a rearview or backup camera system configured for monitoring conditions during forward or reverse travel of the vehicle.

Referring now to FIG. 1, the device 10 includes a body 16 defining a cavity 18. For example, the body 16 may be a rear hatch or a front fascia of a vehicle. Alternatively, although not shown, the body 16 may be an external housing of a security device, such as a surveillance camera. The device 10 includes the camera system 12 attached to the body 16 within the cavity 18.

Figure 2:
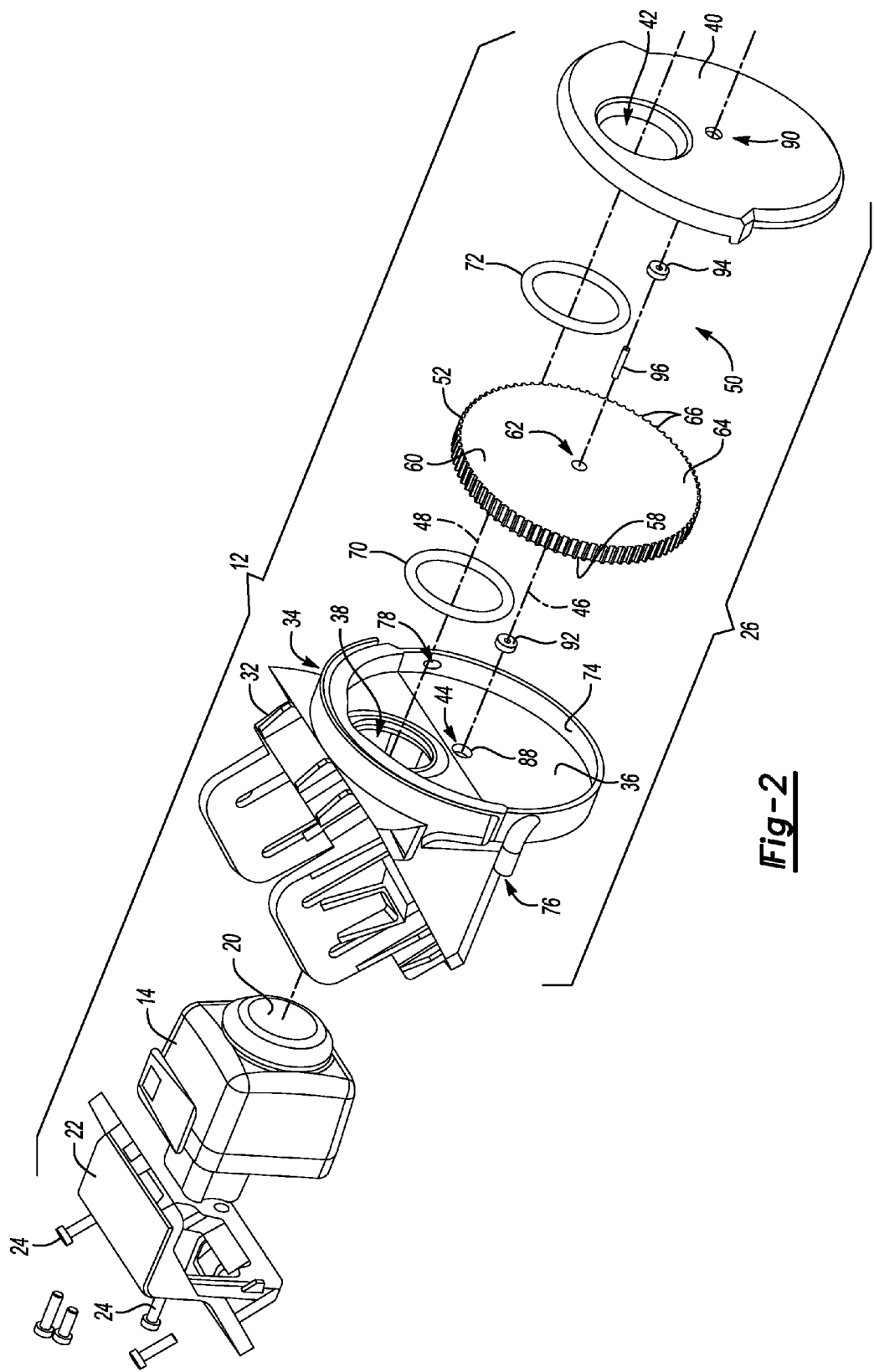
FIG. 2 is a schematic illustration of an exploded perspective view of the camera system of FIG. 1.

As best shown in FIG. 2, the camera system 12 includes the camera 14 including a lens 20. Generally, the lens 20 may be an optical lens having a field of vision, e.g., in front of the camera 14, and may be configured for collecting light so that the camera 14 may produce an image. In addition, although not shown, the camera system 12 may include a plurality of cameras 14, e.g., two or more cameras 14 attached to the body 16 (FIG. 1) within a respective one of a plurality of cavities 18 (not shown).

In one embodiment described with reference to FIG. 1, the camera 14 may at least partially protrude from the cavity 18 so that the lens 20 is continuously disposed external to the cavity 18. Further, the camera 14 may be fixedly attached to the body 16 such that the camera 14 does not rotate or translate with respect to the body 16. That is, the camera 14 may be stationary with respect to the body 16, and may not, for example, pivot or deploy into position during use. For example, as shown in FIG. 2, the camera 14 may include a bracket 22 and a plurality of fasteners 24 each configured for attaching the camera 14 to the body 16.

Figure 3:
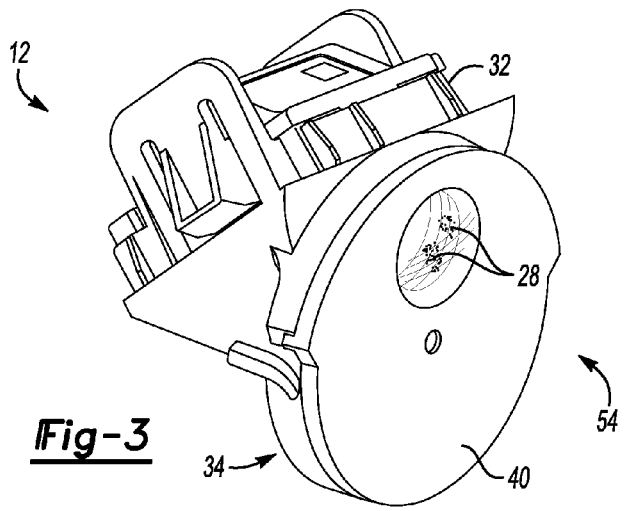
FIG. 3 is a schematic illustration of a perspective view of the camera system of FIGS. 1 and 2.
Figure 4:
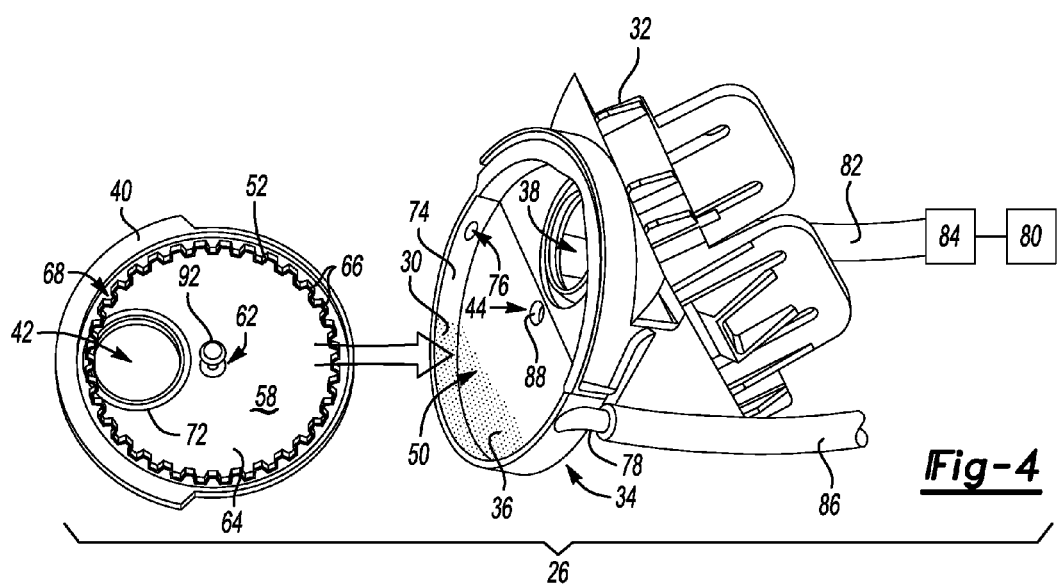
FIG. 4 is a schematic illustration of an exploded perspective view of another embodiment of the camera system of FIGS. 1 and 2.

Referring now to FIGS. 2 and 4, the camera system 12 also includes a wiper assembly 26 attached to the camera 14 and configured for removing a contaminant (shown generally at 28 in FIG. 3) from the camera system 12, e.g., from the field of vision of the lens 20. For example, the contaminant 28 may be water, ice, fog, dirt, dust, salt, particles, smudges, objects, and combinations thereof. As such, the wiper assembly 26 may clean and protect an area in front of the lens 20 to ensure that a viewable image is produced by the camera 14, even during dusty, dirty, wet, and/or freezing operating conditions. In addition, although not shown, the camera system 12 may include a plurality of wiper assemblies 26, e.g., two or more wiper assemblies 26 attached to the camera 14.

The wiper assembly 26 may be characterized as fluid-actuatable and may autonomously clean the lens 20 without requiring manual wiping of the lens 20 by an operator. That is, the wiper assembly 26 may be activated by a fluid (shown generally at 30 in FIG. 4), e.g., windshield washer fluid or another cleaning fluid or solvent.

In particular, as described with reference to FIG. 2, the wiper assembly 26 includes a housing 32. The housing 32 may attach to the bracket 22 and may surround or enclose the camera 14. The housing 32 further includes a circular frame 34 having a back panel 36 that defines a first viewport 38. The first viewport 38 may be a void or a cutout defined by the back panel 36, and the first viewport 38 may align with and cover the lens 20 so that the lens 20 may still collect light and produce an image.

With continued reference to FIG. 2, the wiper assembly 26 further includes a shield 40 defining a second viewport 42 spaced apart from the first viewport 38. That is, the second viewport 42 may be a void or a cutout defined by the shield 40. As assembled, the second viewport 42 may align with and cover the first viewport 38 and the lens 20 so that the lens 20 may still collect light and produce an image.

For example, the back panel 36 may have a center 44 and a central axis 46 extending through the back panel 36 at the center 44. The second viewport 42 may be aligned with the first viewport 38 along a longitudinal axis 48 that is parallel to the central axis 46. As described in more detail below, the shield 40 is attached to the circular frame 34 to define a wash chamber 50 between the shield 40 and the circular frame 34.

Referring again to FIG. 2, the wiper assembly 26 also includes a disc 52 formed from a transparent material, e.g., a plastic or a glass. The disc 52 is disposed between the shield 40 and the housing 32 within the wash chamber 50 such that the disc 52 covers the lens 20 at the first viewport 38. In addition, the disc 52 is rotatable within the wash chamber 50 between a first position 54 (FIG. 3) in which the contaminant 28 is disposed on and at least partially obscures the disc 52 at the second viewport 42, and a second position 56 (FIG. 1) in which the contaminant 28 is not disposed on the disc 52 at the second viewport 42.

More specifically, as best shown in FIG. 2, the disc 52 may have a first surface 58 facing the back panel 36 and a second surface 60 facing the shield 40. The disc 52 may also have a central portion 62 and an edge 64, and may include a plurality of teeth 66 extending from the central portion 62 in a direction perpendicular to the central axis 46 along the edge 64. Further, as best shown in FIG. 4, adjacent ones of the plurality of teeth 66 may define a groove 68 therebetween.

The camera system 12 may further include a first gasket 70 disposed between and in contact with the first surface 58 and the back panel 36, and a second gasket 72 disposed between and in contact with the second surface 60 and the shield 40. That is, the disc 52 may be sandwiched between and contact the first gasket 70 and the second gasket 72. During operation, the second gasket 72 may wipe the disc 52 at the second viewport 42 as the disc 52 rotates from the first position 54 to the second position 56. The first gasket 70 may also seal the first viewport 38 off from the fluid 30, and the second gasket 72 may seal the second viewport 42 off from the fluid 30.

In addition, as best shown in FIG. 2, the back panel 36 may define a first bearing channel 88 therein and the shield 40 may define a second bearing channel 90 therein. The camera system 12 may further include a first bearing 92 disposed within the first bearing channel 88, a second bearing 94 disposed within the second bearing channel 90, and an axle shaft 96 extending through and attached to the disc 52 along the central axis 46 so that the disc 52 rotates about the central axis 46 upon contact with the fluid 30.

In particular, as described with reference to FIG. 2, the circular frame 34 may also include a circular wall 74 abutting the back panel 36 and defining an inlet port 76 configured for injecting the fluid 30 against the plurality of teeth 66 within the groove 68 such that the disc 52 rotates from the first position 54 (FIG. 3) to the second position 56 (FIG. 1). The circular wall 74 may also define an outlet port 78 configured for removing the fluid 30 and the contaminant 28 from the wash chamber 50 when the disc 52 is disposed in the second position 56.

As such, during operation, the fluid 30 may be disposable in contact with the disc 52. The camera system 12 may further include a fluid source 80 (FIG. 4) configured for storing the fluid 30, e.g., a reservoir or container configured for holding the fluid 30, and a first conduit 82 (FIG. 4) connected to the fluid source 80 and the inlet port 76. The first conduit 82 may be configured for conveying the fluid 30 from the fluid source 80, through the inlet port 76, to the plurality of teeth 66. The camera system 12 may also include a pump 84 (FIG. 4) configured for delivering the fluid 30 to the inlet port 76.

Likewise, the camera system 12 may include a second conduit 86 (FIG. 4) connected to the outlet port 78 and configured for conveying the fluid 30 and the contaminant 28 from the wash chamber 50.

Therefore, during operation, the fluid 30 may be injected into the wash chamber 50 through the inlet port 76 such that the fluid 30 contacts the plurality of teeth 66 within the groove 68 and thereby rotates the disc 52 about the central axis 46. As such, the second gasket 72 may abut and squeegee or wipe the disc 52 clean to remove the contaminant 28 from the second viewport 42. That is, as the disc 52 rotates about the central axis 46 in response to the fluid 30, the second gasket 72 may wipe the disc 52 clean and remove the contaminant 28 from the second viewport 42 so that the lens 20 may collect light and the camera 14 may produce an image free from obstruction or obscuration by the contaminant 28.

Therefore, the camera system 12 may clear the contaminant 28 from the field of vision in front of the lens 20 by dousing the wash chamber 50 with the fluid 30, rotating the disc 52, and squeegeeing the disc 52 clean. As such, the camera system 12 may be useful for automotive or industrial vehicle applications in which a vehicle includes a solvent reservoir and/or pump 84 and operates in a dusty, wet, and/or dirty environment. For example, a vehicle windshield wiper solvent pump may actuate the wiper assembly 26. Similarly, the camera system 12 may be useful for security monitoring or consumer communications applications in which the camera 14 is periodically or remotely cleaned during use.

The aforementioned camera system 12 provides excellent image quality and lens life for cameras 14 exposed to harsh environmental conditions. That is, the camera system 12 provides cleaning and wiping functionality for cameras 14 exposed to dirt, dust, debris, ice, snow, water, and the like. In particular, the wiper assembly 26 may optimize the performance, functionality, and lifespan of cameras 14 exposed to the elements during operation.

By cleaning and protecting the disc 52 covering the lens 20, debris, dust, and/or ice build-up on the disc 52 may be minimized and the camera 14 may provide optimized image quality. In addition, the camera system 12 including the wiper assembly 26 is economical and may be tightly packaged to provide the aforementioned advantages. That is, the wiper assembly 26 may provide an easily-packaged actuator for the camera 14 and allows for, for example, on-vehicle cameras 14 that are configured to provide excellent image quality without frequent cleaning and/or maintenance.

While the best modes for carrying out the disclosure have been described in detail, those familiar with the art to which this disclosure relates will recognize various alternative designs and embodiments for practicing the disclosure within the scope of the appended claims.

The invention claimed is:

1. A camera system comprising:
   a camera including a lens; and
   a wiper assembly attached to the camera and configured for removing a contaminant from the camera system, wherein the wiper assembly includes:
      a housing including a circular frame having a back panel that defines a first viewport, wherein the first viewport covers the lens;
      a shield defining a second viewport spaced apart from the first viewport, wherein the shield is attached to the circular frame to define a wash chamber between the shield and the circular frame; and
      a disc formed from a transparent material and disposed between the shield and the housing within the wash chamber such that the disc covers the lens at the first viewport;
      wherein the disc is rotatable within the wash chamber between:
         a first position in which the contaminant is disposed on and at least partially obscures the disc at the second viewport; and
         a second position in which the contaminant is not disposed on the disc at the second viewport;
      wherein the back panel has a center and a central axis extending through the back panel at the center; and
      wherein the second viewport is aligned with the first viewport along a longitudinal axis that is parallel to the central axis.

2. The camera system of claim 1, wherein the disc has a first surface facing the back panel and a second surface facing the shield.

3. The camera system of claim 2, further including a first gasket disposed between and in contact with the first surface and the back panel.

4. The camera system of claim 3, further including a second gasket disposed between and in contact with the second surface and the shield.

5. The camera system of claim 4, wherein the second gasket wipes the disc at the second viewport as the disc rotates from the first position to the second position.

6. The camera system of claim 1, wherein the disc has a central portion and an edge, and includes a plurality of teeth extending from the central portion in a direction perpendicular to the central axis along the edge.

7. The camera system of claim 6, wherein adjacent ones of the plurality of teeth define a groove therebetween.

8. The camera system of claim 7, further including a fluid disposable in contact with the disc, wherein the circular frame includes a circular wall abutting the back panel and defining:
   an inlet port configured for injecting a fluid against the plurality of teeth within the groove; and
   an outlet port configured for removing the fluid from the wash chamber.

9. The camera system of claim 8, further including:
   a fluid source configured for storing the fluid; and
   a first conduit connected to the fluid source and the inlet port, wherein the first conduit is configured for conveying the fluid from the fluid source, through the inlet port, to the plurality of teeth.

10. The camera system of claim 9, wherein the back panel defines a first bearing channel therein and the shield defines a second bearing channel therein.

11. The camera system of claim 10, further including:
    a first bearing disposed within the first bearing channel;
    a second bearing disposed within the second bearing channel; and
    an axle shaft extending through and attached to the disc along the central axis so that the disc rotates about the central axis upon contact with the fluid.

12. A camera system comprising:
    a camera including a lens; and
    a wiper assembly attached to the camera and configured for removing a contaminant from the camera system, wherein the wiper assembly includes:
       a housing including a circular frame having a back panel that defines a first viewport, wherein the first viewport covers the lens;
       a shield defining a second viewport spaced apart from the first viewport, wherein the shield is attached to the circular frame to define a wash chamber between the shield and the circular frame;
       a disc formed from a transparent material and disposed between the shield and the housing within the wash chamber such that the disc covers the lens at the first viewport;
       wherein the disc has a central portion and an edge, and includes a plurality of teeth extending from the central portion along the edge;
       wherein the disc is rotatable within the wash chamber between:
          a first position in which the contaminant is disposed on and at least partially obscures the disc at the second viewport; and
          a second position in which the contaminant is not disposed on the disc at the second viewport;
       a fluid disposable in contact with the disc;
       wherein the circular frame includes a circular wall abutting the back panel and defining:
          an inlet port configured for injecting the fluid against the plurality of teeth such that the disc rotates from the first position to the second position; and
          an outlet port configured for removing the fluid and the contaminant from the wash chamber when the disc is disposed in the second position; and
       a pump configured for delivering the fluid to the inlet port.

13. The camera system of claim 12, wherein the disc has a first surface facing the back panel and a second surface facing the shield; and
    wherein the camera system further includes a first gasket disposed between and in contact with the first surface and the back panel.

14. The camera system of claim 13, further including a second gasket disposed between and in contact with the second surface and the shield.

15. The camera system of claim 14, wherein the second gasket wipes the disc at the second viewport as the disc rotates from the first position to the second position.

16. A device comprising:
a body defining a cavity;
a camera system attached to the body within the cavity and including:
   a camera including a lens; and
   a wiper assembly attached to the camera and configured for removing a contaminant from the camera system, wherein the wiper assembly includes:
      a housing including a circular frame having a back panel that defines a first viewport, wherein the first viewport covers the lens;
      a shield defining a second viewport spaced apart from the first viewport, wherein the shield is attached to the circular frame to define a wash chamber between the shield and the circular frame; and
      a disc formed from a transparent material and disposed between the shield and the housing within the wash chamber such that the disc covers the lens at the first viewport;
   wherein the disc is rotatable within the wash chamber between:
      a first position in which the contaminant is disposed on and at least partially obscures the disc at the second viewport; and
      a second position in which the contaminant is not disposed on the disc at the second viewport;
   wherein the back panel has a center and a central axis extending through the back panel at the center; and
   wherein the second viewport is aligned with the first viewport along a longitudinal axis that is parallel to the central axis.

17. The device of claim 16, wherein the wiper assembly further includes:
   a fluid disposable in contact with the disc;
   a first gasket that seals the first viewport off from the fluid; and
   a second gasket that seals the second viewport off from the fluid.

18. The device of claim 17, wherein the second gasket wipes the disc at the second viewport as the disc rotates from the first position to the second position.

* * * * *